Dec. 27, 1966    E. A. ANDERSON    3,294,208
ONE-WAY ROLLER OVERRUNNING REVERSIBLE CLUTCH
Filed Sept. 16, 1964    2 Sheets-Sheet 1

INVENTOR.
EDWARD A. ANDERSON
BY Williams, David,
Hoffmann & Yount
ATTORNEYS

Dec. 27, 1966   E. A. ANDERSON   3,294,208
ONE-WAY ROLLER OVERRUNNING REVERSIBLE CLUTCH

Filed Sept. 16, 1964   2 Sheets-Sheet 2

INVENTOR.
EDWARD A. ANDERSON
BY
ATTORNEYS

United States Patent Office 3,294,208
Patented Dec. 27, 1966

3,294,208
ONE-WAY ROLLER OVERRUNNING REVERSIBLE CLUTCH
Edward A. Anderson, Cleveland Heights, Ohio, assignor to The Lamson & Sessions Co., Cleveland, Ohio, a corporation of Ohio
Filed Sept. 16, 1964, Ser. No. 396,878
15 Claims. (Cl. 192—44)

The present invention relates to uni-directional engaging devices and more particularly to uni-directional or one-way clutches of the type where revolvable wedge elements are disposed in a generally annular space between coaxial driving and driven members and moved to a wedging position between the members to effect a drive therebetween when the relative rotation of the driving member is in one direction with respect to the driven member, and to a release position when the relative rotation of the driving member is in the other direction with respect to the driven member.

In present commercial clutches of the type described, the wedging elements are biased by individual spring elements which must be hand assembled. Moreover, the outer member of the clutch assembly is usually shaped to provide seats for the springs and a piece separate from the outer member is used to maintain the springs and wedging elements in assembled relationship. The intricate shape of this outer member has made it difficult to form by cold extruding processes and when so formed the intricate nature of the spring seats has made the finishing operations costly.

The principal object of the present invention is the provision of a new and improved one-way clutch which is durable, economical and simple to manufacture, and which can be rapidly and readily assembled either by hand or machine.

Another object of the present invention is the provision of a new and improved one-way clutch, of the character referred to, having a novel wedge element positioning means for moving the revolvable members into wedging engagement with the radially spaced walls of the coaxial driving and driven members.

A further object of the present invention is the provision of a new and improved one-way clutch, of the character referred to wherein one of the coaxial members contains a plurality of recesses in which the revolvable wedge elements are disposed and wherein the novel wedge element positioning means includes yieldable members which are disposed within the generally annular space between the coaxial driving and driven members and outside of the recesses for biasing the wedge elements toward wedging engagement with the radially spaced walls of the coaxial driving and driven members.

Another object of the present invention is the provision of a new and improved one-way clutch, of the character referred to, having a novel wedge element positioning means for moving the wedge elements into wedging engagement with the radially spaced walls of the coaxial driving and driven members to rotate said members as a unit when the driving member is rotated in one direction and for moving the revolvable members out of wedging engagement with the radially spaced walls when the driving member is rotated in the other direction.

Another object of the present invention is the provision of a new and improved one-way clutch, as defined in the preceding object, wherein the wedge element positioning means for moving the wedging elements into and out of wedging engagement comprises a cage having a plurality of annularly spaced upstanding walls or elements whose inner surface is in frictional contact with the outer surface of the driving member.

Yet another object of the present invention is the provision of a novel driven member for a one-way clutch, of the character referred to, comprising an annular wall containing a plurality of alternately spaced shallow depth recesses whose opposite end portions form an obtuse angle with adjacent cylindrical portions located between said recesses and an annular axially extending flange or lip which can be bent inwardly toward the annular wall to serve as a retainer element for the clutch when assembled.

A further object of the present invention is the provision of a novel driven member, as defined in the preceding object, which can be manufactured by using cold forming methods and finished by using ordinary grinding wheels.

A still further object of the present invention is to provide a new and improved clutch assembly of the type where inner and outer members are connected in driving relationship by roller elements disposed therebetween and in which the outer member may be readily cold formed to include a lip which is deformed to hold the rollers and the positioning means therefor in assembly with the remainder of the clutch assembly.

Other objects, novel characteristics and advantages of this invention will be apparent in the following detailed description and in the accompanying drawings forming a part of this specification and in which.

Figure 3:
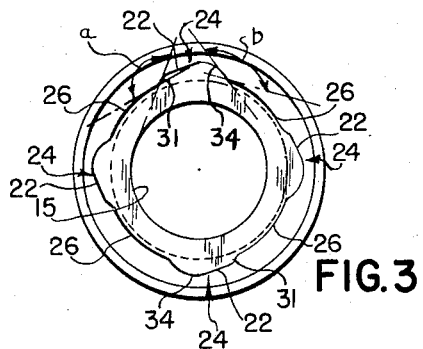
FIG. 3 is a plan view of a part of the device illustrated in FIG. 1.

Referring to the drawings, the present invention is shown as embodied in a uni-directional or one-way clutch 10. The term uni-directional or one-way clutch as employed in the specification and claims refers to a clutch wherein a driving or input member and a driven or output member are to be connected in a driving relationship when the relative rotation of one of the members is in one direction with respect to the other member and to be disconnected for relative rotation when the relative rotation of the one member is in the opposite direction with respect to the other member.

The one-way clutch 10 comprises a driving or input member 12, in the illustrated embodiment, a shaft which is coaxially received in an opening 15 which extends through a driven or output member 14. The driven member 14 has an enlarged end portion 14a and the opening 15 is enlarged in the portion 14a to provide an opening 15a of greater diameter than the shaft 12 and to define a cup-shaped end portion having a side wall 16 radially spaced from the outer surface 17 of the driving member 12 and an annular bottom wall 18 extending perpendicularly thereto.

The side wall 16 of the cup-shaped portion and the outer surface 17 of the driving member 12 define therebetween a generally annular space 20 for receiving rolling wedge elements, cylindrical rollers 21 in the first embodiment, for connecting the shaft 12 to drive the output member 14. The rollers 21 are disposed in the cup-shaped portion between the outer surface 17 of the shaft 12, which forms a cylindrical outer race, and the bottoms 22 of recesses 24 formed in the side wall 16 of the enlarged opening 15a. There is a recess 24 corresponding to each of the rolling elements 21 and the recesses each receive a portion of the periphery of the corresponding one of the rollers. The side wall 16 of the enlarged opening 15a may be described as being comprised of alternately arranged cylindrical and recessed portions 26 and 24, respectively, with the cylindrical portions 26 being coaxial with the shaft 12.

The rollers 21 are biased toward one end of their respective recesses 24 by a roller positioning means including corresponding biasing members 30 disposed in the generally annular space 20 defined by the cylindrical portions 26 of the side wall 16 and the outer surface 17 of the shaft 12. The biasing members or elements 30 urge the rollers 21 toward one end of their corresponding recesses where the distance between the bottom surface 22 of the recess and the outer shaft surface is less than the diameter of the roller elements 21 to provide a relationship between the surfaces such that the rolling elements 21 will wedge between the bottom of the recess and the shaft if the relative rotation of the shaft 12 with respect to the member 14 is in a direction tending to move the rollers in the same direction as the bias applied by the biasing elements, which direction is counterclockwise, as viewed in FIG. 1. If the relative rotation of the shaft 12 with respect to the member 14 is in the opposite direction, that is, clockwise or the direction opposite the bias applied by the biasing elements 30, the roller elements will be rolled and moved against the bias applied by the biasing elements toward the other end of the corresponding recess where the distance between the bottom 22 of the recess and the shaft is greater than the diameter of the roller elements 21 to provide a non-wedging relationship between the surfaces. Continued relative rotation of the driving member 12 in a clockwise direction with respect to the driven member results in the members 30 yielding to allow the members to freely rotate relative to each other.

Figure 1:
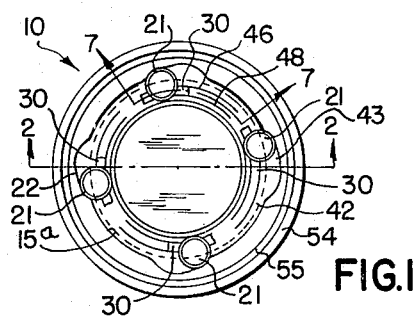
FIG. 1 is a plan view of a uni-directional clutch illustrating one embodiment of the present invention.
Figure 4:
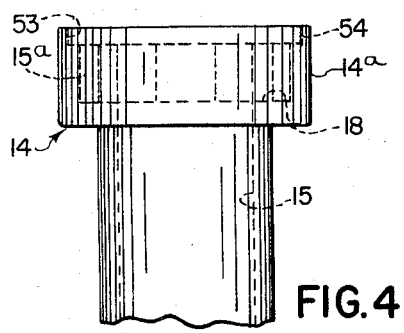
FIG. 4 is a fragmentary elevational view of that part of the device illustrated in FIG. 3.

It should be pointed out that the one-way clutch of the present invention will function as an overrunning clutch when used in an application wherein the driven member 14 is to be driven at a faster rate of speed than the driving member 12 subsequent to the two members being rotated as a unit by rotation of the driving member in a counterclockwise direction, as viewed in FIG. 1. The relative rotation of the driving member 12 with respect to the driven member 14, when the driven member 14 is subsequently rotated at a greater speed in the counterclockwise direction, may be accurately described as in the clockwise direction or in the direction opposite the bias applied by the biasing elements 30. When such relative rotation occurs, the roller elements 21 will be rolled and moved against the bias applied by the biasing elements toward the non-wedging position such that the driven member will freely overrun the driving member and freely rotate relative to the driving member. Moreover, it is to be understood that the driving member can also be said to be relatively rotating in a clockwise direction with respect to the driven member when it is stationary and the driven member is rotating in a counterclockwise direction.

The recessed portions 24 formed in the side wall 16 comprise, as viewed from above the bottom wall 18, a pair of arcuate or radiused end portions 31 and 34 and an intermediate or bottom portion 22. The arcuate or radiused end portion 31 has one end contiguous with one end of the cylindrical portion 26 adjacent thereto and with the tangents of the two portions passing through the point of contiguity forming an obtuse angle $a$ therebetween. The bottom or intermediate portion 22 has a varying radial depth, preferably generally straight and tapered in a radial direction from the axis of the driving member 12, and with one end thereof contiguous with the other end of the first radiused portion 31 and the other end thereof contiguous with the second arcuate or radiused portion 34. The other end of the second arcuate or radiused portion 34, which portion has a larger radius than the first radiused portion 31, is contiguous with one end of the cylindrical portion 26 adjacent thereto and with the tangents of the two portions passing through the point of contiguity forming an obtuse angle $b$ therebetween. The radial depth of the recesses 24, though variable, is relatively small and is preferably limited to that which is necessary to provide the aforementioned wedging and non-wedging relationships between the coaxial member 12 and 14.

Figure 7:
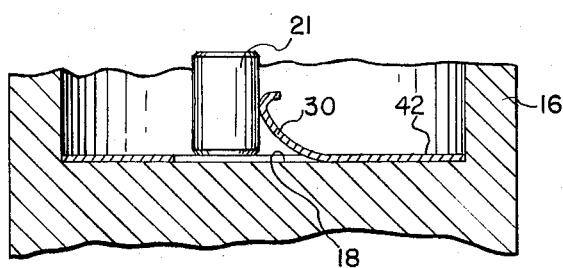
FIG. 7 is an enlarged fragmentary sectional view taken along line 7—7 of FIG. 1.

In the illustrated embodiment the biasing elements or members 30 for the roller elements 21 are connected to an annular plate member 42 disposed within the generally annular space 20 and supported by the bottom wall 18. The plate member 42 has an annular configuration and an outer periphery which is preferably complementary with the configuration of the side wall 16, that is, the plate member 42 includes a corresponding lobe portion 43 extending within each of the recesses 24, which portion prevents the plate member 42 and the driven member 14 from rotating relative to each other. The biasing members 30 are preferably integrally formed with the plate member 42 by lancing first and second concentric arcs 46 and 48 in the plate member 42 and lancing the plate member transversely between the adjacent ends at one end of the arcs. The free ends, that is, the ends adjacent the transverse lance, are then pulled or pushed up and the members 30 bent outwardly of the plane of the plate member 42 until they extend generally transverse to the plate member 42, as illustrated in FIG. 7. The members 30 when so formed will be yieldable and capable of functioning as leaf springs and when the plate 42 is in the annular space 20 will urge the rollers 21 toward the shallow depth or wedging ends of the recesses 28.

The roller elements 21 and the plate 42 are retained within the cup-shaped portion 14a of the driven member 14 by a retaining means 52. The end of the cup-shaped portion 14a remote from the bottom wall has an enlarged opening 53 which is circular and of a larger diameter than the opening 15a to define an annular axially extending side flange or lip 54 and an annular bottom flange 55 extending perpendicular to the lip. The annular lip 54 is adapted to be bent radially inwardly toward the shaft 12 and hold a split retainer ring 57 disposed between the lip 54 and the shaft 12 against the bottom flange 55.

The plate member 42 can be made from any suitable material, preferably sheet metal, such as spring steel, and stamped out and lanced so as to have the configuration shown in the drawings by a suitable press apparatus.

The driven member 14 including the recessed portions 24 and the annular lip 54 can be readily made or produced by cold forming or cold flowing a metal work blank in a suitable die and press apparatus, preferably in a one-step operation. In the embodiment shown, the biasing members 30 are not disposed within the recesses 24, but outside thereof and therefore, all that is required is that the recess 24 have a varying but shallow radial depth limited to that necessary to enable the rolling elements 21, which are partially disposed therein, to provide the wedging and non-wedging relationships between the coaxial members 12 and 14. By limiting the depth and providing a smooth contour or shape for the recesses 24, cold forming of the member 14 is facilitated and in fact the annular lip 57 can be cold formed, since no substantial unbalanced flow of metal will take place during the cold forming operation. If the recesses 24 contain burrs, as the result of the cold forming operation, they can be removed and the surfaces of the recesses finished by ordinary grinding wheels having axes extending generally parallel to the axis of the outer member 14, since the radiused or arcuate portions 30 and 34 are made large enough so that ordinary grinding wheels may be used to finish them.

Figure 2:
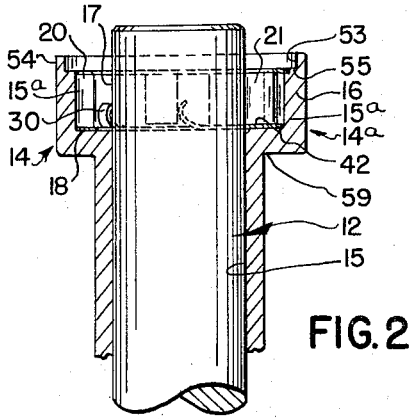
FIG. 2 is a fragmentary sectional view taken approximately along line 2—2 of FIG. 1 with portions shown in elevation.
Figure 6:
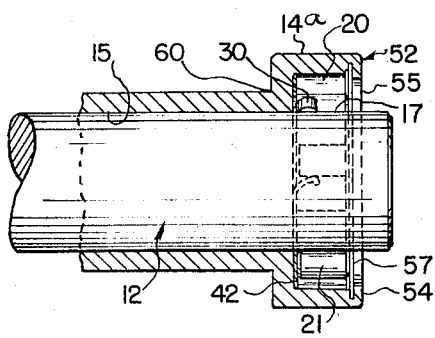
FIG. 6 is a fragmentary vertical sectional view taken along line 6—6 of FIG. 5 with portions shown in elevation.
Figure 5:
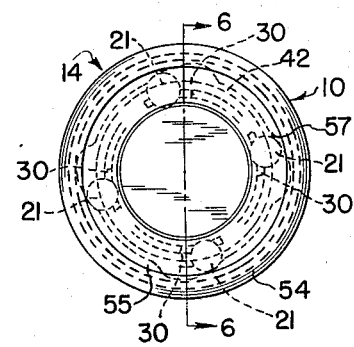
FIG. 5 is a plan view of the device illustrated in FIG. 1 when it is completely assembled.

After the cold forming operation, metal may be removed by a suitable machining operation to form a square corner 59 at the inner end of the enlarged end portion 14a, as illustrated in FIGS. 2 and 6, if desired.

From the foregoing, it can be appreciated that by being able to integrally form and provide an annular lip 54, the need for a separate element to hold the split retainer ring 57 in place is eliminated.

It will be apparent to one skilled in the art that the one-way clutch 10 can be readily and easily assembled by hand or machine. It is assembled by rotatably securing the driving member 12 within the concentric member 14 and in a manner which will prevent relative axial movement therebetween; inserting the pre-formed biasing members 30 and plate member 42 in the generally annular space 20 of the cup-shaped portion 14a; inserting the rolling elements 21 between the bottom 22 of the recesses 24 and the outer surface 17 of the member 12, which elements will be urged toward the wedging end of the recesses 24 by the biasing elements 30; placing the split retainer 57 on the annular flange 55 and bending over the annular lip 54 to securely hold the split retainer ring 57 in place. The use of the disclosed biasing members 30 clearly simplifies assembly, since all spring elements are assembled at one time as a unit. Moreover, the provision of the annular lip 54 eliminates a part heretofore required in clutches of the type described.

Figure 8:
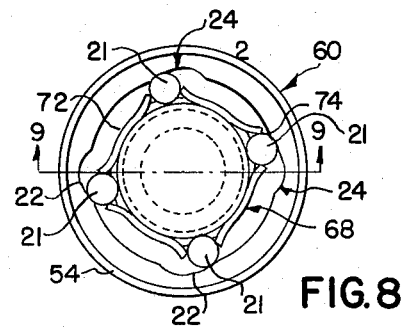
FIG. 8 is a top plan view of a uni-directional clutch illustrating a second or alternate embodiment of the present invention.
Figure 9:
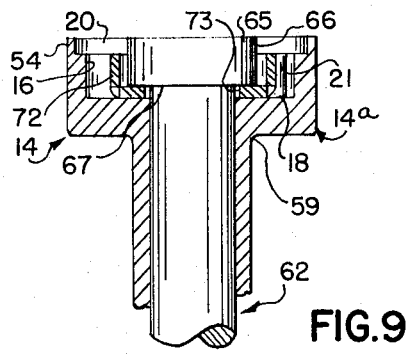
FIG. 9 is a fragmentary sectional view taken approximately along line 9—9 of FIG. 8 with portions shown in elevation.
Figure 10:
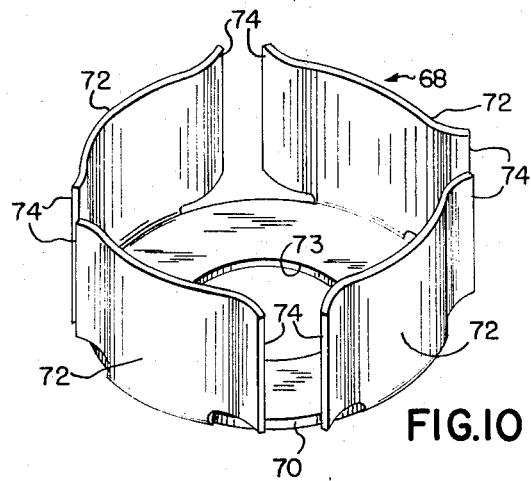
FIG. 10 is a perspective view of part of the clutch shown in FIGS. 8 and 9.

FIGS. 8–10 show an alternate or second embodiment of a uni-directional clutch 60 which is generally similar to the clutch 10 except that it employs a driving member 62 of a slightly different form than the driving member 12 and employs a different roller or wedge element positioning means for moving the rolling wedge elements to their wedging position. In other respects the clutch 60 is substantially the same as the clutch 10 and the same reference characters have been applied to identical or substantially identical parts.

The driving member 62, as in the previous embodiment, is a shaft which is provided with an enlarged diameter portion 65 at its upper end, as viewed in FIG. 9, which is disposed within the generally annular space 20 of the cup-shaped end 14a of the driven member 14. The enlarged diameter portion 65 has an outer cylindrical surface 66 radially spaced from the side wall 16 of the driven member 14 and an undersurface or shoulder 67 which is generally perpendicular to the axis of the shaft 62 and spaced slightly from the bottom wall 18 of the driven member 14.

The roller positioning means comprises a cage means 68 having an annular bottom wall 70 disposed within the space 20 and supported by the annular bottom wall 18 of the driven member 14 and a plurality of four in the illustrated embodiment, circumferentially spaced upstanding or transverse walls or members 72 extending along the outer circumference of the bottom wall 70 and integral therewith. The bottom wall 70 of the member 68 is provided with a central aperture 73 through which the shaft 62 extends and is positioned between the bottom wall 18 of the driven member 14 and the undersurface 67 of the enlarged diameter portion 65 of the shaft 62. The walls 72 are cut or relieved adjacent their end portions at or along their junction with the annular wall 70, as shown in FIG. 10, and the adjacent free end portions of the walls 72 are bowed or bent outwardly toward the wall 16 of the member 14 so as to form fingers or tabs 74 between which the revolvable wedge elements 21 are disposed. A revolvable element is disposed between each adjacent pair of fingers and between the outer surface 66 of the driving member 62 and the recesses 24 of the driven member 14. The walls or members 72 intermediate the end portions thereof are concentric with the shaft 62 and engage or are in frictional contact with the outer surface 66 thereof.

When the driving member 62 is rotated, a frictional force is effected between the member 62 and the cage 68 which moves the cage 68 in the same direction as the direction of rotation of the driving member. Due to this frictional force, the cage 68 will function, in effect, as a biasing means so long as the driving member is being rotated.

When the relative rotation of the driving member or shaft 62 is in a counterclockwise direction with respect to the member 14, as viewed in FIG. 9, the cage 68 and the rolling elements 21 rotatably supported between the tabs 74 will be moved in a counterclockwise direction until the revolvable wedge elements are in wedging engagement between the surface 66 of driving member 62 and the tapered bottom 22 of the recesses 24 at the shallow end. This wedging engagement will effect a drive between the driving and driven members 62 and 14, respectively, and rotate the members as a unit. When the relative rotation of the driving member 62 is in a clockwise direction with respect to the driven member, the cage 68 and the rolling elements 21 between the tabs 74 will be moved in a clockwise direction and out of wedging engagement between the surface 66 of the driving member 62 and the tapered bottom 22 of the recesses 24. Continued relative rotation of the driving member 62 in a clockwise direction with respect to the driven member 14 results in the cage 68 yielding to allow the members to freely rotate relative to each other.

Attention is called to the fact that the one-way clutch 60 will function as an overrunning clutch when used in an application wherein the driven member 14 is to be driven at a faster rate of speed than the driving member 62 subsequent to the two members being rotated as a unit by rotation of a driving member in a counterclockwise direction, as viewed in FIG. 9. When the driven member 14 is subsequently rotated at a greater speed than the driving member 62 in the counterclockwise direction, the relative rotation of the driving member with respect to the driven member may be accurately described as in the clockwise direction. When such relative rotation occurs, the roller elements 21 will be rolled and moved against the bias applied by the cage 68 and in a clockwise direction toward the non-wedging position such that the driven member will freely overrun the driving member and freely rotate relatively thereto. Moreover, it is to be understood that the driving member can also be said to be relatively rotating in a clockwise direction with respect to the driven member when it is stationary and the driven member is rotating in a counterclockwise direction.

The cage 68 can be made from any suitable material, such as sheet metal, and lanced and stamped out so as to have the configuration shown in the drawings by a suitable press apparatus.

Like the previous embodiment of the one-way clutch 10, the one-way clutch 60 can be readily and easily assembled by hand or machine. It may be assembled by inserting the preformed cage 68 in the annular space 20 of the cup-shaped portion 14a of the driven member 14; inserting the driving member 62 within the driven member 14 from its cup-shaped end until the enlarged diameter portion 65 is disposed within the walls 72 of the cage 68 and rotatably securing the driving member 62 within the driven member 14 and in a manner will prevent relative axial movement therebetween; inserting the rolling elements 21 between the bottom 22 of the recesses 24 and the outer surface of the member 62 and between the ends of the tabs 74 of the adjacent walls 72; placing the split retainer 57 on the annular flange 55 of the driven member 14 and bending over the annular lip 54 to securely hold the split retainer in place.

It is to be understood that the frictional engagement between the driving member 62 and the cage 68 may be provided between the annular or bottom wall 70 of the cage 68 and the undersurface 67 of the driving member 62 instead of between the walls 72 and surface 66 of the driving member 62, if desired.

While in the illustrated embodiment, portions of the cage 68 are in frictional contact with the driving member, it is recognized that the frictional contact between the driving member 62 and the cage 68 could possibly be eliminated and the cage 68 modified by providing tabs which are suitably shaped and bent so as to not only rotatably support the rolling elements 21 therebetween but also bias or hold the rolling elements into engagement with the outer surface 66 of the driving member 62. In such a modification, the frictional force effected between the rolling elements 21 and the driving member 62 upon rotation of the driving member would move the rolling elements and cage in the same direction as the direction of rotation of the driving member.

While the driving or input members have been described and illustrated in the embodiments shown as the inner cylindrical members 12 or 62 and the driven or output member as the outer member 14, it will of course be understood that the driving relationship could be reversed, that is, the outer member 14 be the driving or input member and the inner cylindrical members 12 or 62 be the driven or output member, if desired.

From the embodiments illustrated in the accompanying drawings and described above, it will now be readily understood that a one-way clutch has been provided which is economical and simple to manufacture and which can be readily and rapidly assembled either by hand or by machine. Furthermore, it can be seen that a novel driven member having shallow depth and smoothly contoured recesses and an integrally formed annular lip which is adapted to serve as part of a retainer means for the clutch assembly has been provided, and which member can be formed by cold forming a work blank and finishing the recesses to provide a smooth surface therefor by the use of ordinary grinding wheels. With respect to the first embodiment of the one-way clutch, it can be seen that a novel wedge or rolling element positioning means located within the generally annular space between the coaxial members has been provided for biasing the rolling wedge elements into contact with the walls of the two coaxial members and with respect to the second embodiment of the one-way clutch, it can be seen that another novel wedge or rolling element positioning means disposed between the coaxially disposed driving and driven members has been provided for moving the rolling wedge elements to their wedging position when the driving member is rotated in one direction and to their non-wedging position when the driving member is rotated in the other direction.

Although the uni-directional clutch device of this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In a uni-directional engaging device comprising coaxially disposed driving and driven members supported for rotation; one of said members having a race surface; the other of said members having a generally coaxial surface radially spaced from said race surface and having at least one peripheral recess having a bottom of varying radial depth; a wedge element disposed between said recess and said race surface and movable in said recess between a wedging position for effecting rotation of said members as a unit when the relative rotation of one of said members is in one direction with respect to the other of said members and a releasing position when the relative rotation of said one member is in the opposite direction with respect to said other member; wedge element positioning means disposed between said coaxially disposed members including a member disposed outside of said recess and between said recess and said race surface for moving said wedge element to said wedging position when the relative rotation of said members is in said one direction, and retainer means for retaining said wedge elements and said wedge element positioning means in their dispositions between said coaxially disposed members, said retainer means comprising a generally radially extending retainer member supported by said other member and an axially extending lip integral with said other member which is bent over to retain said retainer member in place.

2. In a uni-directional engaging device comprising two coaxially disposed members supported for rotation; one of said members having a race surface; the other of said members having a generally coaxial surface radially spaced from said race surface containing a plurality of peripherally spaced recesses having a bottom wall of varying radial depth; a generally annular plate member disposed between said radially spaced surfaces and extending generally normal to the axes of rotation of said coaxially disposed members; a plurality of arcuately spaced yieldable members extending transversely to said plate member and having one end connected to said plate members; said yieldable members being disposed wholly outside of said recesses; and wedging elements disposed within said recesses and movable in said recesses between a wedging position for effecting rotation of said members as a unit when the relative rotation of one of said members is in one direction with respect to the other of said members and a non-wedging position when the relative rotation of said one member is in the opposite direction with respect to said other member said yieldable members biasing said wedge elements toward said wedging position.

3. In a uni-directional engaging device comprising two coaxially disposed members supported for rotation; one of said members having a race surface; the other of said members having a generally coaxial surface radially spaced from said race surface containing a plurality of peripherally spaced recesses having tapered wall portions; a generally annular plate member disposed between said radially spaced surfaces; said plate member being supported by said other member and being disposed in a plane extending generally normal to the axes of rotation of said coaxially disposed member; a plurality of yieldable members extending in a direction generally transverse to said plate member and having one end connected to said plate member; said yieldable members being disposed wholly outside of said recesses; and wedge elements disposed between said tapered wall portion of said recesses and said race surface and movable in said recesses between a wedging position in which said elements are in wedging engagement with said tapered wall portions and said race surface for effecting rotation of said members as a unit when the relative rotation of one of said members is in one direction with respect to the other of said members, and a non-wedging position in which they are not in wedging engagement with said tapered wall portions and said race surface when the relative rotation of said one member is in the opposite direction with respect to said other member, said yieldable members biasing said wedge elements toward said wedging position.

4. In a uni-directional clutch device comprising two coaxially disposed members supported for rotation; an inner driving member having an outer cylindrical race surface; an outer driven member comprising a cup-shaped end portion having an annular first wall and a generally annular second wall whose inner surface comprises alternately spaced cylindrical and recessed portions radially spaced from the driving member; a generally annular plate member supported in juxtaposition to said first wall and disposed in a plane extending generally normal to the axis of the driving member; said plate member having a plurality of arcuately spaced lobe portions at its outer periphery which extend within the recessed portions of the driven member to prevent relative rotation therebetween; a plurality of yieldable members extending generally transversely of said plate member in a direction away from said first wall and located wholly outside of said recesses; said yieldable members being integrally connected at one end to said plate member; and wedge elements disposed between said recesses and said outer surface of said driving member and movable in said recesses between a wedging position for effecting rotation of said members as a unit when the relative rotation of said driving member is in one direction with respect to said driven member and a release position when the relative rotation of said driving member is in the other direction with respect to said driven member, said yieldable members engaging and biasing said wedge elements toward said wedging position.

5. In a uni-directional clutch device as defined in claim 4 including a retainer means for retaining said plate member and said wedge elements within said cup-shaped end portion.

6. In a uni-directional clutch device as defined in claim 5 wherein said retainer means comprises a split retainer ring and an annular lip integral with said cup-shaped portion which is adapted to be bent over to hold said retainer ring in place.

7. In a uni-directional clutch device; a driving member having an axis and an outer cylindrical surface forming an inner race; a driven member concentrically disposed with respect to said driving member; said driven member having an annular first wall extending generally normal to the axis of said driving member and a generally annular second wall radially spaced from the outer surface of said driving member; said second wall having a plurality of peripherally spaced recesses having a wall portion tapering in a radial direction from the axis of said driving member; a generally annular plate member supported by said first wall and having an outer periphery complementary with the periphery of said second wall including arcuately spaced lobe portions extending within the recesses to prevent relative rotation between the plate member and the driven member; a plurality of arcuately spaced yieldable members integral with said plate member said arcuately spaced yieldable members are lanced from said plate member and bent so that they extend generally transversely of said plate member in a direction away from said first wall; said yieldable member being located wholly outside of said recesses; and wedge elements disposed between said tapered wall portion and said outer surface of said driving member and movable in said recesses between a wedging position in which said elements are in wedging engagement with said tapered wall portions and said cylindrical surface for effecting rotation of said driving and driven members as a unit when the relative rotation of said driving member is in one direction with respect to said driven member, and a release position in which said elements are not in wedging engagement with said tapered wall portions and said cylindrical surface when the relative rotation of said driving member is in the other direction with respect to said driven member, said yieldable members biasing said wedge elements toward said wedging position.

8. In a uni-directional engaging device comprising coaxially disposed driving and driven members supported for rotation; one of said members having a race surface; the other of said members having a generally coaxial surface with at least one peripheral recess having a wall portion of varying radial depth; a wedge element disposed between said race surface and said wall portion of said recess and movable in said recess between a wedging position for effecting rotation of said members as a unit when the relative rotation of said driving member is in one direction with respect to said driven member and a releasing position when the relative rotation of said driving member is in the other direction with respect to said driven member, and a wedge element positioning means comprising a cage disposed between said coaxial driving and driven members and having peripherally spaced portions thereon for rotatably supporting said wedge element between said race surface and said recess and for preventing translatory movement of said wedge element circumferentially relative to said cage.

9. In a uni-directional engaging device comprising coaxially disposed driving and driven members supported for rotation; said driving member having a race surface; said driven member having a generally coaxial surface radially spaced from said race surface containing a plurality of peripherally spaced recesses having bottoms of varying radial depth; wedge elements disposed between said bottoms of said recesses and said race surface and movable between a wedging position in which said elements are in wedging engagement with said bottoms of said recesses and said race surface for effecting rotation of said members as a unit when the relative rotation of said driving member is in one direction with respect to said driven member and a non-wedging position in which they are not in wedging engagement with said bottoms of said recesses and said race surface when the relative rotation of said driving member is in the other direction with respect to said driven member; wedge element positioning means disposed between said coaxially disposed members comprising a cage for moving said wedge elements from said releasing position to said wedging position when said driving member is rotated in said one direction relative to said driven member, said cage being in frictional contact with said driving member for moving said cage therewith when said driving member is rotated, said cage comprising a plurality of arcuately spaced members having adjacent end portions which cooperably engage a wedge element disposed therebetween to rotatably support the wedge element between the race surface and the recess in which it is disposed and to prevent translatory movement of the portion of the wedge element disposed between the cage and the driven member circumferentially relative to said cage.

10. In a uni-directional engaging device comprising coaxially disposed driving and driven members supported for rotation; said driving member having a race surface; said driven member having a generally coaxial surface radially spaced from said race surface containing a plurality of peripherally spaced recesses having bottoms of varying radial depth; wedge elements disposed between said bottoms of said recesses and said race surface and movable between a wedging position in which said elements are in wedging engagement with said bottoms of said recesses and said race surface for effecting rotation of said members as a unit when the relative rotation of said driving member is in one direction with respect to said driven member and a non-wedging position in which they are not in wedging engagement with said bottoms of said recesses and said race surface when the relative rotation of said driving member is in the other direction with respect to said driven member; wedge element positioning means disposed between said coaxially disposed members comprising a cage disposed between said radially spaced surface and having a plurality of arcuately spaced members in frictional contact with said driving member for movement therewith when said driving member is rotated, said arcuately spaced members of said cage having their ends bowed outwardly and each adjacent pair of ends rotatably supporting a wedge element disposed therebetween.

11. In a uni-directional engaging device, as defined in claim 9, and wherein said wedge elements are cylindrical rollers.

12. In a uni-directional engaging device, as defined in claim 11, and wherein said arcuately spaced members are in frictional contact with said driving member, and wherein said end portions of said arcuately spaced members are bowed outwardly.

13. In a uni-directional engaging device comprising a driving member having an axis and an outer cylindrical surface forming an inner race surface; an outer coaxial driven member comprising a cup-shaped end portion having an annular first wall and a generally annular second wall radially spaced from said race surface and whose inner surface comprises alternately spaced cylindrical and recessed portions; said recessed portions having bottoms of varying radial depth; wedge elements disposed between said bottoms of said recessed portions and said race surface and movable between a wedging position in which said elements are in wedging engagement with the bottoms of said recessed portions and said race surface for effecting rotation of said members as a unit when the relative rotation of said driving member is in one direction with respect to said driven member and a nonwedging position in which they are not in wedging engagement with said bottoms of said recessed portions and said race surface when the relative rotation of said driving member is in the other direction with respect to said driven member; and a wedge element positioning means disposed between said driving and driven members comprising a cage for moving said wedge elements from said nonwedging position to said wedging position when said driving member is rotated in said one direction relative to said driven member, said cage having an annular end wall rotatably supported by said driven member and a plurality of axially extending arcuately spaced members in frictional contact with said driving member for moving said cage with said driving member when the latter is rotated in said one direction relative to said driven member, said arcuately spaced members having adjacent end portions which define therebetween an opening in which said wedge elements are disposed and which engage said wedge elements disposed therebetween to rotatably support the wedge elements between the race surface and the recessed portions and to prevent translatory movement of the portion of the wedge elements disposed outwardly of the cage circumferentially relative to said cage.

14. In a uni-directional engaging device, as defined in claim 13, and wherein said wedge elements are cylindrical rollers, and wherein said end portions of said arcuately spaced members are bowed outwardly.

15. In a uni-directional engaging device, as defined in claim 13, and including a retainer means for retaining said cage and wedge elements within said cup-shaped end portion, said retainer means comprising a generally radially extending retainer ring supported by said driven member and an annular lip formed integral with said cup-shaped end portion and which is bent over inwardly toward the axis of the driving member to hold the retainer ring in place.

References Cited by the Examiner

UNITED STATES PATENTS

| | | | |
|---|---|---|---|
| 1,878,053 | 9/1932 | Winger | 192—44 |
| 2,630,896 | 3/1953 | Dodge | 192—45.1 |
| 3,014,609 | 12/1961 | Hobbs | 29—509 |
| 3,024,527 | 3/1962 | Buyken | 29—509 |
| 3,104,744 | 9/1963 | Wade | 192—45 |
| 3,174,598 | 3/1965 | Mattson | 192—45 |
| 3,184,020 | 5/1965 | Benson et al. | 192—45 |
| 3,194,368 | 7/1965 | Benson et al. | 192—45 |

FOREIGN PATENTS 218,964   4/1942   Switzerland.

DAVID J. WILLIAMOWSKY, *Primary Examiner.*